US009712867B2

(12) United States Patent
Mamidwar et al.

(10) Patent No.: US 9,712,867 B2
(45) Date of Patent: Jul. 18, 2017

(54) APPLICATION SPECIFIC POLICY IMPLEMENTATION AND STREAM ATTRIBUTE MODIFICATION IN AUDIO VIDEO (AV) MEDIA

(71) Applicant: BROADCOM CORPORATION, Irvine, CA (US)

(72) Inventors: Rajesh Shankarrao Mamidwar, San Diego, CA (US); Sanjeev Sood, San Diego, CA (US); Flaviu Dorin Turean, Palo Alto, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 4 days.

(21) Appl. No.: 14/072,696

(22) Filed: Nov. 5, 2013

(65) Prior Publication Data
US 2015/0082368 A1   Mar. 19, 2015

Related U.S. Application Data

(60) Provisional application No. 61/878,546, filed on Sep. 16, 2013.

(51) Int. Cl.
H04N 21/4405    (2011.01)
H04N 21/2343    (2011.01)
(Continued)

(52) U.S. Cl.
CPC ... *H04N 21/4405* (2013.01); *H04N 21/23608* (2013.01); *H04N 21/234381* (2013.01);
(Continued)

(58) Field of Classification Search
None
See application file for complete search history.

(56) References Cited

U.S. PATENT DOCUMENTS

2005/0076359 A1*   4/2005   Pierson et al. .................. 725/32
2006/0136768 A1*   6/2006   Liu ....................... H04N 5/4401
                                                          713/400
(Continued)

OTHER PUBLICATIONS

IBM, Serpanos and Gourley; 'Multiprocessor for Multiprotocol Router System', Mar. 3, 1993, IBM Technical Disclosure Bulletin, vol. 36 No. 03, pp. 321-323.*

*Primary Examiner* — Omar S Parra
(74) *Attorney, Agent, or Firm* — McDermott Will & Emery LLP

(57) ABSTRACT

A system for presentation timing based audio video (AV) stream processing may include a switch device, a first processor, and a second processor. The switch device may be configured to route AV traffic to the first processor for processing and non-AV traffic to the second processor for processing. The first processor may receive transport stream packets that include an audio stream and/or a video stream. The first processor may receive a request to modify presentation timing of the audio stream and/or video stream. The first processor may modify the transport stream packets and/or presentation timing parameters of the transport stream packets based at least in part on the received request. The first processor may provide the transport stream packets to an electronic device. In some implementations, the second processor may be unable to access the content of the transport stream packets in the clear, e.g. due to security considerations.

20 Claims, 7 Drawing Sheets

(51) Int. Cl.
*H04N 21/236* (2011.01)
*H04N 21/2668* (2011.01)
*H04N 21/434* (2011.01)
*H04N 21/436* (2011.01)
*H04N 21/4385* (2011.01)
*H04N 21/4402* (2011.01)
*H04N 21/4408* (2011.01)
*H04N 21/462* (2011.01)
*H04N 21/81* (2011.01)

(52) U.S. Cl.
CPC ..... *H04N 21/2668* (2013.01); *H04N 21/4344* (2013.01); *H04N 21/43615* (2013.01); *H04N 21/43853* (2013.01); *H04N 21/4408* (2013.01); *H04N 21/440281* (2013.01); *H04N 21/4621* (2013.01); *H04N 21/812* (2013.01)

(56) References Cited

U.S. PATENT DOCUMENTS

| | | | |
|---|---|---|---|
| 2008/0109562 A1* | 5/2008 | Ramakrishnan | H04L 49/90 709/250 |
| 2010/0166387 A1* | 7/2010 | Miyake et al. | 386/95 |
| 2010/0315549 A1* | 12/2010 | Basso et al. | 348/445 |
| 2011/0222837 A1* | 9/2011 | Walton et al. | 386/347 |
| 2014/0369666 A1* | 12/2014 | Clevenger et al. | 386/241 |

* cited by examiner

APPLICATION SPECIFIC POLICY IMPLEMENTATION AND STREAM ATTRIBUTE MODIFICATION IN AUDIO VIDEO (AV) MEDIA

CROSS-REFERENCE TO RELATED APPLICATIONS

The present application claims the benefit of U.S. Provisional Patent Application Ser. No. 61/878,546, entitled "Presentation Timing Based Audio Video (AV) Stream Processing," filed on Sep. 16, 2013, which is hereby incorporated by reference in its entirety for all purposes.

TECHNICAL FIELD

The present description relates generally to audio video (AV) stream processing, and more particularly, but not exclusively, to modifications in attributes, such as Moving Picture Experts Group (MPEG) attributes, of AV media during streaming.

BACKGROUND

Home gateway devices, such as cable subscriber set top boxes (STBs), may include a general purpose host processor, and/or other associated hardware components, for both processing audio video (AV) traffic, such as audio streams, video streams, etc., and for processing non-AV traffic. For example, the host processor may receive AV traffic, decrypt the AV traffic and/or add encryption to the AV traffic, and forward the AV traffic to a computing device operably connected to the gateway device, for example, via a local area network. In addition to performing these actions, the host processor may also process non-AV traffic that is transmitted over the local area network. Accordingly the host processor may negotiate multiple incoming and outgoing network connections, including determining whether traffic transmitted via each network connection should be encrypted or decrypted, encrypting and/or decrypting AV traffic, routing and/or responding to non-AV traffic, and tearing down each network connection when the network connection has been terminated. Furthermore, the host processor may process the traffic uniformly, e.g. in the same manner, irrespective of whether the traffic is AV traffic or non-AV traffic.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for application specific policy implementation and stream attribute modification in AV media, a gateway device may include a dedicated processor along with associated hardware and/or firmware that exclusively processes AV traffic transmitted through the gateway device. In one or more implementations, the dedicated processor and associated hardware and/or firmware may collectively be referred to as an AV stream processor, an advanced stream processor (ASP), and/or a stream processor. Accordingly, the AV stream processor of the gateway device may be specifically configured to process AV traffic, for example based on one or more attributes and/or characteristics of AV traffic, which may provide for more efficient processing of AV traffic than may be achievable by the host processor, and may thereby reduce the latency associated therewith.

For example, since the AV stream processor operates as a dedicated engine, separate from the host processor, the AV stream processor can access transport stream packets of AV traffic "in the clear," e.g. free of any encryption or other digital rights management (DRM) mechanisms, while the host processor may only have access to the encrypted or otherwise protected transport stream packets. Thus, the AV stream processor can access parameters and values associated with the transport stream packets, such as presentation time stamp (PTS) values, program clock reference (PCR) values, continuity counter (CC) values, packet identifiers (PIDs), etc. Accordingly, the AV stream processor may be able to modify parameters and values carried by the transport stream packets, such as PCRs, PTSs, PIDs, CCs, and/or generally any other system data, (even when received encrypted), whereas the host processor alone may be unable to perform presentation timing based processing of the transport stream packets, e.g. when the transport stream packets are received encrypted.

Figure 1:
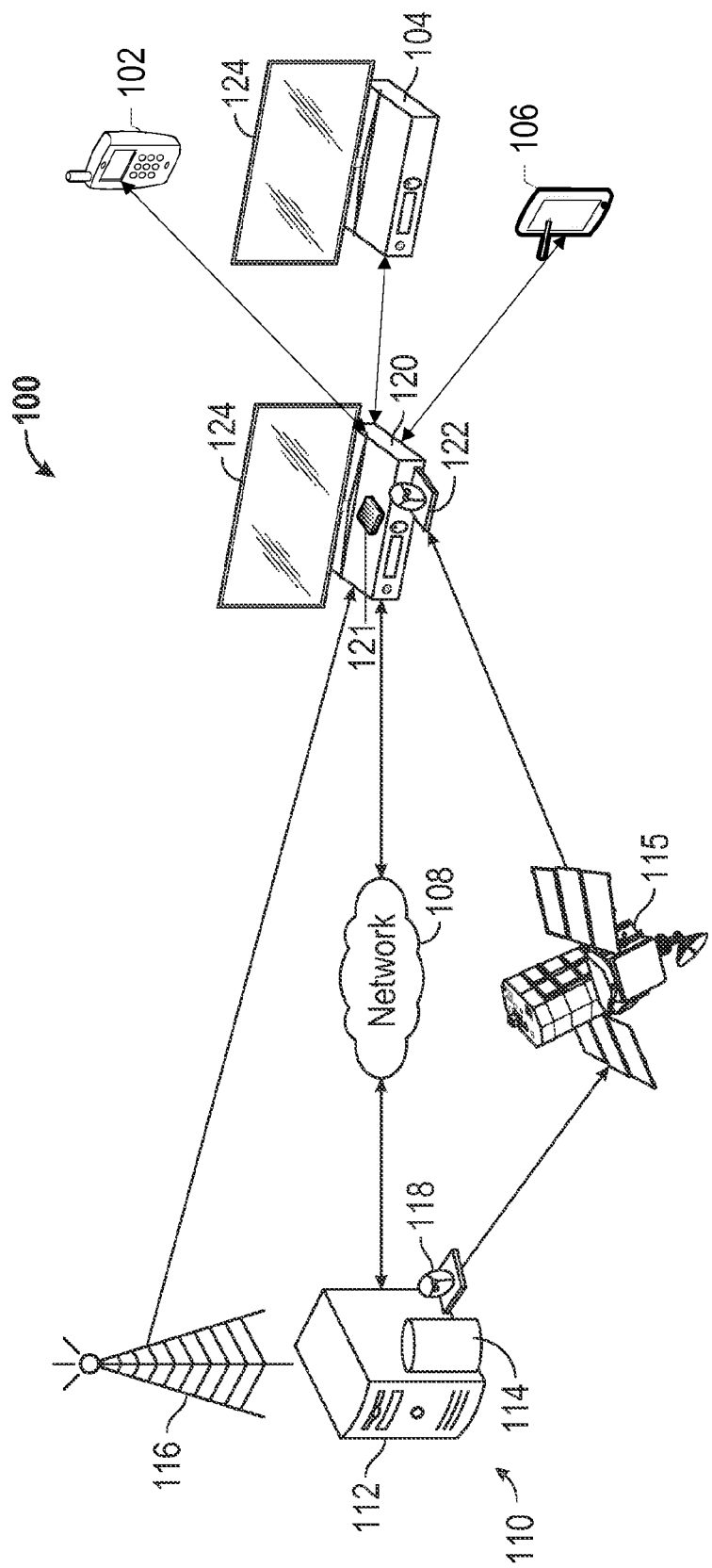
FIG. 1 illustrates an example network environment in which a system for application specific policy implementation and stream attribute modification in AV media may be implemented in accordance with one or more implementations.

FIG. 1 illustrates an example network environment 100 in which a system for application specific policy implementation and stream attribute modification in AV media may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to a gateway device 120, such as by a network 108. In one or more implementations, the network environment 100 may further include one or more electronic devices 102, 104, 106 that are communicably coupled to the gateway device 120. The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include one or more transmission networks, such as a coaxial transmission network, a fiber optic transmission network, or generally any transmission network that communicatively couples the content server 112 and the gateway device 120.

The CDN 110 may include, and/or may be communicably coupled to, a content server 112, an antenna 116 for transmitting AV streams, such as via multiplexed bitstreams, over the air, and a satellite transmitting device 118 that transmits AV streams, such as via multiplexed bitstreams to a satellite 115. The gateway device 120 may include, and/or may be coupled to, a satellite receiving device 122, such as a satellite dish, that receives data streams, such as multiplexed bitstreams, from the satellite 115. In one or more implementations, the gateway device 120 may further include an antenna for receiving data streams, such as multiplexed bitstreams over the air from the antenna 116 of the CDN 110. In one or more implementations, the content server 112 may transmit AV streams to the gateway device 120 over the coaxial transmission network, such as by utilizing technology implementing the Data Over Cable Service Interface Specification (DOCSIS). The content server 112 and/or the gateway device 120, may be, or may include, one or more components of the electronic system discussed below with respect to FIG. 6.

The content server 112 may include, or may be coupled to, one or more processing devices and/or a data store 114. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, that may be collocated with the content server 112 or may be disparately located from the content server 112.

The content server 112 may transmit AV streams that include AV programs, such as television programs, movies, radio programs, podcasts, music, or generally any multimedia programs, via the network 108, the antenna 116, and/or the satellite 115. For example, the content server 112 may transmit Internet Protocol (IP) streams, such as unicast streams, such as adaptive bit rate (ABR) streams, multicast streams, and/or broadcast streams, that include AV streams over the network 108 and the content server 112 may transmit QAM-modulated and/or multiplexed bitstreams that include AV streams via the coaxial transmission line, the antenna 116 and/or the satellite 115, e.g. through the satellite transmitting device 118. In one or more implementations, any network data transmissions that include AV streams and/or AV data, and/or are associated with AV streams and/or AV data, such as acknowledgments for AV streams, may be referred to as AV traffic (or AV network traffic). Similarly, any network data transmissions that do not include, and/or are not associated with, AV streams and/or AV data, may be referred to as non-AV traffic (or non-AV network traffic).

The gateway device 120 may include, or may be coupled to, memory, a host processor for processing non-AV traffic, and a dedicated processor, along with associated hardware/firmware, that exclusively processes AV traffic, e.g. an AV stream processor, an AV processor or a stream processor. In one or more implementations, gateway device 120 may include a switch device that can be configured to route non-AV traffic to the host processor and AV traffic to the AV stream processor. Thus, in gateway device 120, AV traffic processing by the AV stream processor is decoupled from non-AV traffic processing by the host processor. In one or more implementations, the gateway device 120 may also be, or may also include, a set-top box, e.g. a device that is coupled to, and is capable of presenting AV programs on, an output device 124, such as a television, a monitor, speakers, or any device capable of presenting AV programs. In one or more implementations, the gateway device 120 may be integrated into the output device 124. The gateway device 120 may receive AV streams from the content server 112, such as multiplexed bitstreams, that include AV programs, such as television programs, movies, or generally any AV content. The gateway device 120 may receive the AV streams from the content server 112 via the antenna 116, via the network 108, and/or via the satellite 115. The gateway device 120 may also include, and/or may be communicably coupled to, a hard drive 121 that may store AV content, such as programs, commercials, etc. An example gateway device 120 implementing the subject system, and example operations thereof, are discussed further below with respect to FIGS. 2-5, respectively.

In the example network environment 100 of FIG. 1, the gateway device 120 is configured to couple the electronic devices 102, 104, 106 to the content server 112 and/or to the network 108, e.g. by using the aforementioned switch device. For example, the gateway device 120 may receive requests for AV traffic from the electronic devices 102, 104, 106 and may forward the requests to the content server 112. In response to the requests, the gateway device 120 may receive AV traffic from the content server 112 and may forward the AV traffic to one or more of the electronic devices 102, 104, 106. In one or more implementations, the gateway device 120 may receive and/or retrieve AV streams via one or more local AV sources, such as the hard drive 121 and/or one or more local AV tuners. For example, the electronic devices 102, 104, 106 may record AV programs on the local hard drive of the gateway device 120. The gateway device 120 may then provide the recorded AV programs to the electronic devices 102, 104, 106 for playback, e.g. in response to the requests therefore.

The electronic devices 102, 104 and 106 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for receiving, decoding, and presenting of AV programs and/or can be coupled to such a device. In the example of FIG. 1, electronic device 102 is depicted as a smart phone, electronic device 104 is depicted as a set-top box, and electronic device 106 is depicted as a tablet device. In one or more implementations, any of electronic devices 102, 104, 106 may be referred to as a user device or a client device. For example, the electronic device 104 and the gateway device 120 may both be set-top boxes and the electronic device 104 may operate as a client device of the gateway device 120.

In operation, any of the streams transmitted by the content server 112 may be transport streams, such as MPEG transport streams, MPEG-2 transport streams, and the like, and/or any of the streams may be program streams, such as MPEG program streams, MPEG-2 program streams, and the like. For example, the content server 112 of the CDN 110 may packetize the video frames of video streams and/or audio frames of audio streams, into packetized elementary stream (PES) packets. Thus, each PES packet may include one video frame (or audio frame), and the PES packets may be variable sized to account for the varying sizes of different types of video frames, e.g. I-frames, B-frames, P-frames, etc. The header of a PES packet may include a time stamp that indicates when the video frame and/or audio frame contained in the PES packet should be decoded and presented, such as presentation time stamps (PTS), decoding time stamps (DTS), or generally any time stamps. The header of a PES packet may further include an elementary stream clock reference (ESCR) that may be used to synchronize the system time clock of the content server 112 with the system time clock of a receiving device, such as the gateway device 120. In one or more implementations, a program stream may include a group of tightly coupled PES packets referenced to the same time base, which may be indicated in the program stream by a system clock reference (SCR). Similar to the ESCR, the SCR may be used to synchronize the system time clock of the content server 112 with the system time clock of a receiving device, such as the gateway device 120.

The content server 112 may then segment and encapsulate the PES packets into transport stream packets, such as MPEG transport stream packets, which may be a fixed size, such as 188-byte packets, 192-byte packets, or generally any size packets. In one or more implementations, the AV streams may be encapsulated in any transport stream packets, such as Xpackets. The header of a transport stream packet may include one or more data fields pertaining to the payload of the transport stream packet, such as a program clock reference (PCR). Similarly to the ESCR and the SCR, the PCR may be used to synchronize the system time clock of the content server 112 with the system time clock of a receiving device, such as electronic devices 102, 104, 106, and/or gateway device 120. The header of a transport stream packet may also include a continuity counter value that is incremented for each transport stream packet for which a payload is present. The header of the transport stream packet may also include a payload unit start indicator (PUSI) bit which may be set to 1 if the transport stream packet includes the start of a PES packet, which also coincides with the start of an audio frame and/or video frame. Thus, the PUSI bit indicates whether the transport stream packet includes the start of an audio frame and/or video frame. In one or more implementations, the content server 112 may encrypt the payloads of the transport stream packets, but not the headers of the transport stream packets, e.g. using a conditional access (CA) system. In one or more implementations, the content server 112 may further encapsulate the transport stream packets into internet protocol (IP) packets, e.g. for transmission over the network 108.

The gateway device 120 may receive the transport stream packets and/or IP packets that include the transport stream packets, and may decode and/or decrypt the transport stream packets to recover the AV stream. For local playback, e.g. on the output device 124, the gateway device 120 may identify a random access point in the AV stream, may decode the AV stream starting at the random access point, and may present the AV stream on the output device 124. In one or more implementations an AV stream may refer to an audio stream and/or a video stream.

The gateway device 120 may also prepare the received transport stream packets for transmission to one or more of the electronic devices 102, 104, 106, such as by encrypting the transport stream packets, and/or packetizing the transport stream packets, e.g. into IP packets. The gateway device 120 may then transmit the packets to one or more of the electronic devices 102, 104, 106. In one or more implementations, the gateway device 120 may modify the AV stream contained in the transport stream packets, e.g. dropping one or more audio and/or video frames of the AV stream by dropping the corresponding transport stream packets, adding one or more audio and/or video frames to the AV stream by adding corresponding transport stream packets, replacing one or more audio and/or video frames of the AV stream by replacing the corresponding transport stream packets, and/or modifying timing parameters of the transport stream packets, before encrypting and packetizing the transport stream packets for transmission to the electronic devices 102, 104, 106. Since the AV stream processor of the gateway device 120 can access the transport stream packets and/or PES packets "in the clear," e.g. without encryption, the AV stream processor of the gateway device 120 may have access to, and be able to modify and/or replace, audio and/or video frames of the AV stream.

In one or more implementations, the AV stream processor of the gateway device 120 may receive AV streams from the CDN 110 and may provide the received AV streams to one or more of the electronic devices 102, 104, 106. When the AV streams are received from the CDN 110, one or more parameters and/or attributes of the AV streams, such as PCRs, PTSs, PIDs, CCs, etc., may be set by the CDN 110 to ensure that the AV streams are MPEG compliant. However, if the AV streams are modified by the AV stream processor of the gateway device 120, e.g. for commercial insertion/replacement, trick modes, etc., the parameters and/or attributes of the modified AV streams may no longer be MPEG compliant. Thus, the AV stream processor of the gateway device 120 may need to alter one or more parameters and/or attributes of each modified AV stream to keep the modified AV streams MPEG compliant, e.g. before the AV streams are provided to the electronic devices 102, 104, 106. Furthermore, the AV stream processor of the gateway device 120 may also insert audio mute frames and/or video null frames into the modified AV streams, e.g. to facilitate modifications to the AV streams and/or transitions associated therewith.

Figure 2:
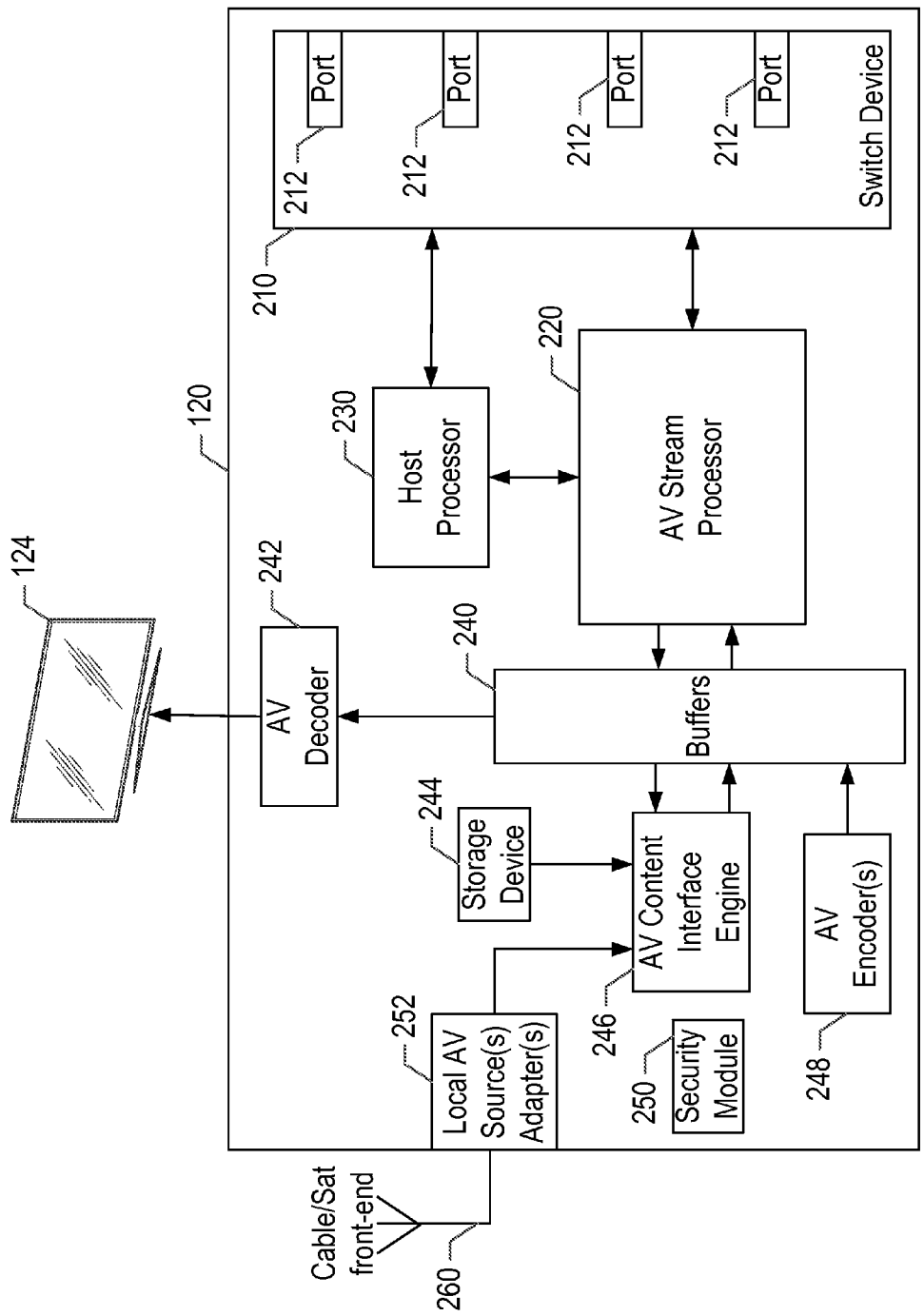
FIG. 2 illustrates an example gateway device implementing a system for application specific policy implementation and stream attribute modification in AV media in accordance with one or more implementations.

FIG. 2 illustrates an example gateway device 120 implementing a system for application specific policy implementation and stream attribute modification in AV media in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The gateway device 120 includes a switch device 210, an AV stream processor 220, a host processor 230, one or more buffers 240, an AV decoder 242, a storage device 244, an AV content interface engine 246, one or more AV encoders 248, a security module 250, one or more local AV source adapters 252, and a cable/satellite front end 260. The cable/satellite front end 260 may include the satellite receiving device 122, and one or more other devices and/or connections for receiving AV content via a coaxial transmission network, via satellite, via antenna, and/or via any other transmission network. The switch device 210 may include one or more ports 212, such as Ethernet ports, multimedia over coax alliance (MoCA) ports, reduced gigabit media independent interface (RGMII) ports, and the like.

The buffers 240 may be, or may include, one or more memory modules, such as dynamic random-access memory (DRAM). For explanatory purposes, the buffers 240 are illustrated as a single block; however, the buffers 240 may be several separate individual buffers, or several separate partitions of one or more memory modules. The AV decoder 242 may be configured to retrieve transport stream packets from the buffers 240, decode the transport stream packets, and present the AV stream contained therein via the output device 124, e.g. via a local physical connection, such as a high-definition multimedia interface (HDMI) connection. The AV encoders 248 may transcode or otherwise encode AV streams, e.g. for transmission to one or more of the electronic devices 102, 104, 106. The storage device 244 may be, or may include, a non-volatile storage medium, such as a hard drive, and may store one or more AV programs, such as AV programs received by the gateway device 120. In one or more implementations, the storage device 244 may be the hard drive 121 of FIG. 1.

The local AV source adapters 252 may be one or more adapters configured to receive AV streams over one or more local AV connections, such as satellite, coaxial, etc. For example, the local AV source adapters 252 may include one or more tuners for receiving multiplexed bitstreams over satellite, coaxial, etc. The local AV source adapters 252 may also process received streams, such as demultiplexing multiplexed bitstreams, to access the individual AV streams and/or transport stream packets. The AV content interface engine 246 aggregates the received AV streams, e.g. transport stream packets received from the content server 112, from coaxial or satellite connections, e.g. via local AV source adapters 252, and/or stored on the storage device 244. The AV content interface engine 246 then stores the transport stream packets in the buffers 240, e.g. without encryption, for transmission to the electronic devices 102, 104, 106, and/or for presentation via a local output device 124.

In one or more implementations, the transport stream packets received from any of the AV sources may be encrypted, or may otherwise include a security mechanism that prevents access to the AV content and/or associated presentation timing parameters the transport stream packets. The security module 250 may operate in conjunction with one or more other components of the gateway device 120 to decrypt the received transport stream packets. For example, the security module 250 may implement a conditional access system that utilizes, e.g., entitlement control messages (ECMs) and/or entitlement management messages (EMMs) to control access to the AV content of the transport stream packets. The security module 250 may generally implement any access system that is required to decrypt or otherwise access the AV content and/or the associated presentation timing parameters of the transport stream packets.

The AV stream processor 220 may include one or more processors, memory, such as dynamic random-access memory (DRAM), firmware, and one or more other modules and/or associated circuitry for processing AV traffic, such as a packetizer module, a depacketizer module, one or more security modules, and the like. The host processor 230 may be a general purpose processor of the gateway device 120. The host processor 230 and the AV stream processor 220 may be communicatively coupled to one another, for example, via a transmission line. The switch device 210 may include suitable circuitry and/or logic for routing network traffic, such as AV traffic and non-AV traffic, to one or more components of the gateway device 120, such as the host processor 230 and/or the AV stream processor 220.

In this regard, the host processor 230 and/or the AV stream processor 220 may individually be associated with a port on the switch device 210. For example, the AV stream processor 220 may be associated with a first port and the host processor 230 may be associated with a second port that is distinct from the first port. The switch device 210 may be configured to route communications received from, and/or transmitted to, an communicatively connected device, such as one or more of the electronic devices 102, 104, 106 and/or the content server 112, to either port and consequently to either of AV stream processor 220 or host processor 230.

The switch device 210 may initially be configured to forward data packets, for example data packets corresponding to AV traffic and non-AV traffic, to the host processor 230 via the port associated with host processor 230. The host processor 230 may be configured to setup and tear-down network connections using a socket API. Upon establishing a network connection, the host processor 230 may determine whether AV traffic will be transmitted over the network connection. If the host processor 230 determines that AV traffic will be transmitted over the network connection, the host processor 230 transfers the network connection to the AV stream processor 220 and configures the switch device 210 to route the AV traffic for the network connection to the AV stream processor 220, for example, by programming configurable filters of the switch device 210. When the transmission of the AV traffic has completed, and the network connection is ready to be closed, the AV stream processor 220 transfers the network connection back to the host processor 230 for teardown. If the host processor 230 determines that non-AV traffic will be transmitted over the network connection, the host processor 230 may process the non-AV traffic. In one or more implementations, network connections corresponding to any incoming flows may be transferred by the host processor 230 to the AV stream processor 220.

The AV stream processor 220 may operate in conjunction with the other components of the gateway device 120 to provide AV streams to the electronic devices 102, 104, 106. For example, the AV streams received from the content server 112 may be routed by the switch device 210 to the AV stream processor 220. The AV stream processor 220 may depacketize and/or decrypt the AV streams, e.g. in conjunction with the security module 250, store the AV streams in the buffers 240, and modify attributes and/or parameters of modified AV streams, such as PTS, PCR, PID, CC, etc., as necessary, e.g. to keep the modified AV streams MPEG compliant.

Since the transport stream packets of the received AV streams are stored in the buffers 240 after having any encryption or other security mechanisms removed, the AV stream processor 220 can access the video/audio frames and/or presentation timing parameters of the transport stream packets and perform modifications thereof. For example, in one or more implementations, the electronic devices 102, 104, 106 may store AV programs on the storage device 244 of the gateway device 120. The gateway device 120 may subsequently provide the recorded AV programs to the electronic devices 102, 104, 106 for playback, e.g. via the AV stream processor 220.

During playback of the AV programs, the gateway device 120 may receive requests from an electronic device 102 to change the presentation timing of the AV program, such as fast forward the AV program, rewind the AV program, jump a number of seconds ahead or back in the AV program, etc. In response thereto, the AV stream processor 220 of the gateway device 120 may modify the transport stream packets of the AV program being provided to the electronic device 102 and one or more parameters associated therewith, e.g. PTS, PCR, SCR, CC, etc., to effectuate the requested change in presentation timing of the AV program, which may be referred to as a server-based trick mode. In one or more implementations, the AV stream processor 220 of the gateway device 120 may modify the one or more parameters to ensure that the modified AV stream maintains MPEG compliance. Thus, the processing for providing the server-based trick modes is performed solely by the AV stream processor 220 at the gateway device 120; the electronic device 102 receives the transport stream packets with the correct presentation timing such that the electronic device 102 can decode/display the AV program as if it were a continuous AV stream, i.e. from a presentation timeline perspective.

In order to provide a continuous AV stream to the electronic device 102 during a server-based trick mode, the AV stream processor 220 performs timing generation for the trick mode and modifies the transport stream packets and/or presentation timing parameters thereof based on the presentation timing required by the trick mode before providing the transport stream packets to the electronic device 102. Since the AV stream processor 220 can access the unencrypted transport stream packets from the buffers 240, the AV stream processor 220 can modify the audio and/or video frames and/or presentation timing of the AV stream, as necessary.

For example, if the server-based trick mode is a thirty second skip ahead, the AV stream processor 220 may drop the transports stream packets corresponding to the skipped thirty seconds and may update the PTS/PCR values of the remaining transport stream packets such that the thirty second skip ahead is transparent to the decoder of the electronic device 102. Similarly, if the trick mode is a 2× fast forward, the AV stream processor 220 may lower the PTS/PCR values in the transport stream so that the audio and/or video frames are presented more quickly by the electronic device 102. Alternatively, the AV stream processor 220 may drop the transport stream packets that include every other frame and may update the PTS/PCR values of the remaining transport stream packets such that the remaining frames are decoded and displayed continuously by the electronic device 102. Similarly the AV stream processor 220 may update the continuity counters of the transport stream packets to ensure that the transport stream is compliant with any associated standards, such as MPEG-2, while performing the trick modes. An example process for modifying the presentation timing of transport stream packets by the AV stream processor 220, e.g. to provide a server-based trick mode, is discussed in more detail below with respect to FIG. 3.

The AV stream processor 220 may also perform other application specific policy implementation and stream attribute modification in AV media tasks at the gateway device 120. For example, when an AV program is being recorded to the storage device 244 of the gateway device 120, e.g. on behalf of one of the electronic devices 102, 104, 106, the AV stream processor 220 may generate a navigation file associated with the recording. The navigation file may point to the group of pictures (GOP) boundaries in the video stream of the recorded AV program, the navigation file may include information regarding the location of I-frames in the video stream of the recorded AV program, the navigation file may include information regarding the PTS values of the audio and/or video stream of the recorded AV program, and/or the navigation file may include any other timing parameters associated with the audio and/or video stream of the recorded AV program.

The AV stream processor 220 may also perform commercial insertion for AV streams being provided to the electronic devices 102, 104, 106. Since the AV stream processor 220 has access to the boundaries of the source content and commercials in an AV stream, e.g. the PTS values of the corresponding transport stream packets, the AV stream processor 220 can replace the commercials in the AV stream with commercials that are appropriate for the electronic device 102 to which the AV stream is being provided. For example, commercials may be stored locally on the storage device 244 of the gateway device 120, and the AV stream processor 220 may select one of the locally stored commercials for insertion into an AV stream, e.g. based on characteristics of the electronic device 102 to which the AV stream is being provided, and/or characteristics of a user interacting with the electronic device 102. During commercial insertion, the AV stream processor 220 may also modify and/or replace one or more parameters and/or attributes of the modified AV stream, such as PIDs, PCRs, PTSs, CCs, etc., in order to keep the modified AV stream MPEG compliant. An example process for commercial insertion by the AV stream processor 220 is discussed further below with respect to FIG. 4.

In one or more implementations, the gateway device 120 may operate as a client device, such as a client device receiving an AV stream from the content server 112 for presentation on the output device 124 via the AV decoder 242. The AV stream processor 220 may perform client-based trick modes at the gateway device 120, e.g. when the content server 112 does not support server-based trick modes. For example, the AV stream processor 220 may receive transport stream packets from the content server 112 and may adjust the aforementioned timing parameters of the transport stream packets, based on the requested trick mode, before providing the transport stream packets to the AV decoder 242. In one or more implementations, the AV stream processor 220 may be implemented in one or more of the electronic devices 102, 104, 106, e.g. in addition to the host processors of the electronic devices 102, 104, 106, and the AV stream processor 220 may perform the client-based trick modes at the electronic devices 102, 104, 106.

In one or more implementations, the AV stream processor 220 may be configurable, e.g. via an application programming interface (API) and/or a user interface, e.g. a graphical user interface, to implement the aforementioned trickmodes, commercial insertions, and/or any other processing of the AV traffic that is received by the AV stream processor 220. For example, an AV traffic processing policy may be generated and provided to the AV stream processor 220, e.g. via an API and/or user interface, such a graphical user interface. The AV stream processor 220 may implement the policy to process the received AV traffic in the indicated manner. In one or more implementations, the AV traffic processing policies may be stored on a memory of the gateway device 120, such as the storage device 244, and the AV traffic processing policies may be activated or deactivated via an API and/or a user interface. An example process for implementing an AV traffic processing policy by the AV stream processor 220 is discussed further below with respect to FIG. 5.

Figure 3:
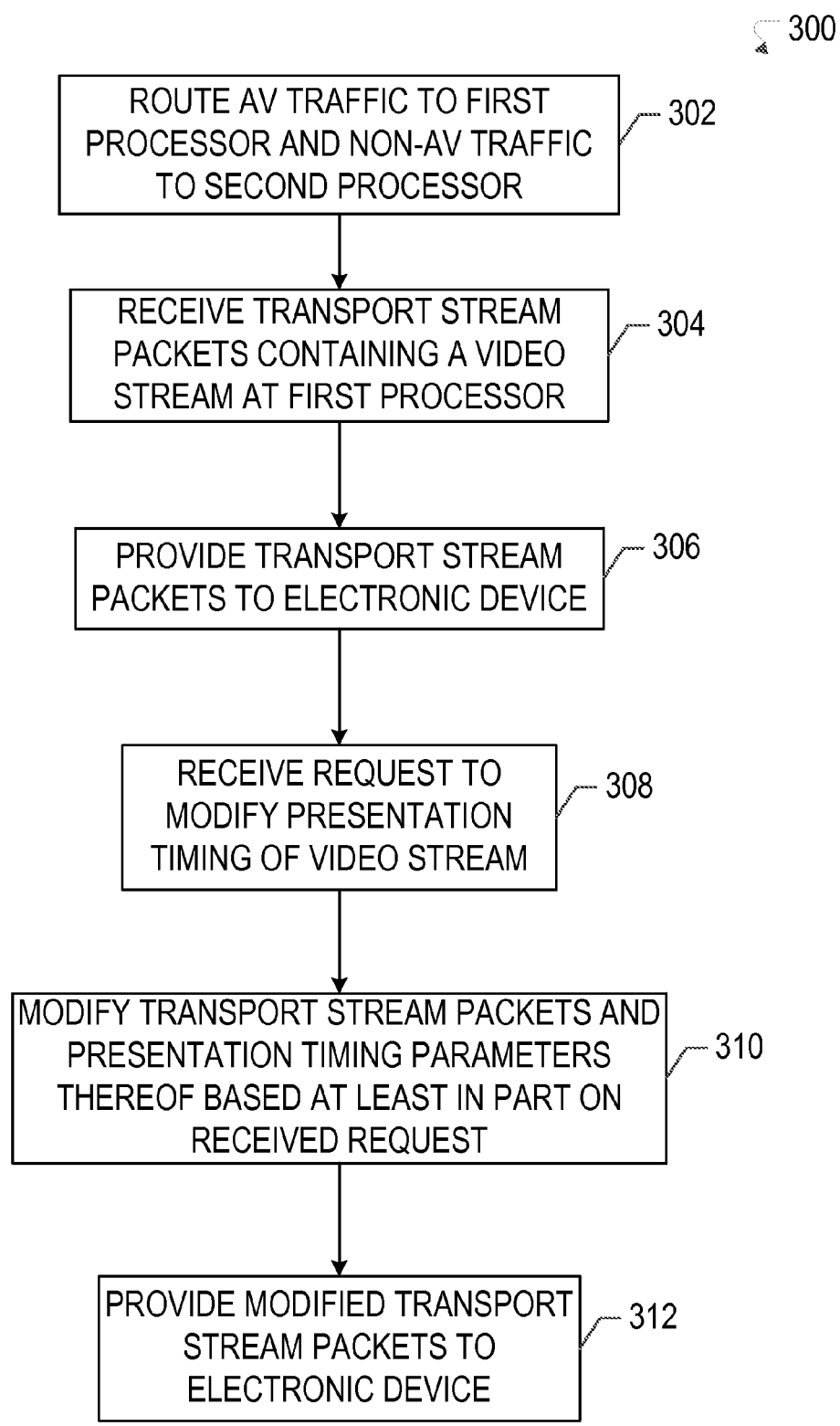
FIG. 3 illustrates a flow diagram of an example process of a system for application specific policy implementation and stream attribute modification in AV media in accordance with one or more implementations.

FIG. 3 illustrates a flow diagram of an example process 300 of a system for application specific policy implementation and stream attribute modification in AV media in accordance with one or more implementations. For explanatory purposes, the example process 300 is described herein with reference to the gateway device 120 of FIGS. 1 and 2; however, the example process 300 is not limited to the gateway device 120 of the example process 300 of FIGS. 1 and 2, and the example process 300 may be performed by one or more components of the gateway device 120. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The switch device 210 of the gateway device 120 receives AV traffic and non-AV traffic, e.g. from content server 112, and/or electronic devices 102, 104, 106. The switch device 210 routes the AV traffic to a first processor, e.g. the AV stream processor 220, and the non-AV traffic to a second processor, e.g. the host processor 230 (302). The AV traffic may include transport stream packets containing an AV stream that are received by the first processor, e.g. the AV stream processor 220 (304). In one or more implementations, the transport stream packets may also be received via one or more of the local AV source adapters 252 and/or retrieved from the storage device 244. In one or more implementations, the received transport stream packets may be decrypted, e.g. using the security module 250. In one or more implementations, the received and/or decrypted transport stream packets may be stored in the buffers 240, e.g. by the first processor.

The first processor, e.g. the AV stream processor 220, may retrieve the transport stream packets containing the AV stream from the buffers 240 and may provide the transport stream packets to one or more of the electronic devices 102, 104, 106 for presentation of the AV stream (306). In one or more implementations, the AV decoder 242 may decode and present the AV stream on the output device 124. The first processor, e.g. the AV stream processor 220, may receive a request to modify the presentation timing of the AV stream (308), such as from one of the electronic devices 102, 104, 106 and/or from a user interacting with the gateway device 120, e.g. a user viewing the AV stream on the output device 124. The request may be, for example, a request to fast forward the AV stream, rewind the AV stream, jump forward in the AV stream, jump backward in the AV stream, etc. In one or more implementations, the request to fast forward and/or jump forward may not be available when the transport stream packets correspond to a live stream, e.g. as opposed to an AV program being retrieved from the storage device 244.

The first processor, such as the AV stream processor 220, may modify the transport stream packets containing the AV stream and/or the presentation timing parameters of the transport stream packets, e.g. PTS, PCR, continuity counter, etc., based at least in part on the received request (310). For example, if the received request corresponds to fast forwarding the AV stream, the AV stream processor 220 may drop a number of audio and/or video frames from the AV stream, e.g. by dropping the corresponding packets, and may modify the PTS values of the remaining transport stream packets to reflect that the remaining transport stream packets should be presented continuously. For example, the AV stream processor 220 may drop the second frame spanning over multiple transport stream packets, the fourth frame, etc., and the AV stream processor 220 may modify the PTS value of the third frame to indicate that the third frame should be presented after the first frame, the fifth frame to indicate that the fifth frame should be presented after the third frame, etc. In one or more implementations, the AV stream processor 220 may also modify the continuity counter values, and/or any other parameter or attribute, of the remaining transport stream packets. The AV stream processor 220 may then transmit the modified transport stream packets to the electronic device 102, e.g. via the switch device 210 (312). The electronic device 102 may receive the transport stream packets and may decode the transport stream packets and present the AV stream contained therein. Since the parameters of the modified AV stream, e.g. PTS, PCR, PID, CC, etc., were modified by the AV stream processor 220, e.g. to maintain MPEG compliance, the electronic device 102 may achieve continuous and seamless media play of the AV stream.

Figure 4:
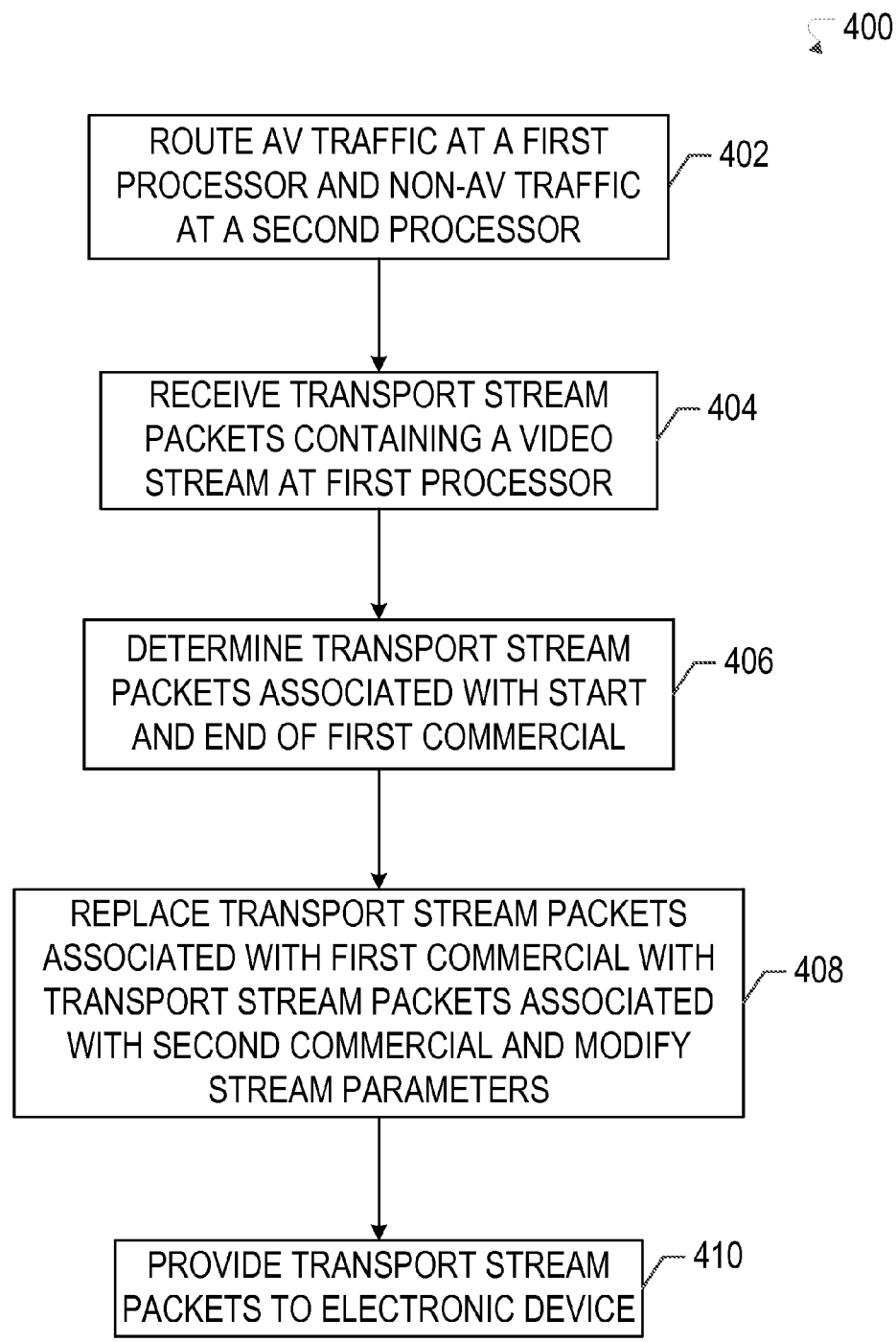
FIG. 4 illustrates a flow diagram of an example process of a system for application specific policy implementation and stream attribute modification in AV media in accordance with one or more implementations.

FIG. 4 illustrates a flow diagram of an example process 400 of a system for application specific policy implementation and stream attribute modification in AV media in accordance with one or more implementations. For explanatory purposes, the example process 400 is described herein with reference to the gateway device 120 of FIGS. 1 and 2; however, the example process 400 is not limited to the gateway device 120 of the example process 400 of FIGS. 1 and 2, and the example process 400 may be performed by one or more components of the gateway device 120. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The switch device 210 of the gateway device 120 receives AV traffic and non-AV traffic, e.g. from content server 112, and/or electronic devices 102, 104, 106. The switch device 210 routes the AV traffic to a first processor, e.g. the AV stream processor 220, and the non-AV traffic to a second processor, e.g. the host processor 230 (402). The AV traffic may include transport stream packets containing an AV stream that are received by the first processor, e.g. the AV stream processor 220 (404). In one or more implementations, the transport stream packets may also be received by one or more of the local AV source adapters 252 and/or retrieved from the storage device 244. In one or more implementations, the received transport stream packets may be decrypted, e.g. using the security module 250. In one or more implementations, the received and/or decrypted transport stream packets may be stored in the buffers 240.

The first processor, e.g. the AV stream processor 220, determines a transport stream packet corresponding to a start of a commercial in the AV stream, and a transport stream packet corresponding to the end of the commercial in the AV stream (406). In one or more implementations, the AV stream processor 220 may receive overhead information and/or out of band information that indicates the start and end of a commercial in the AV stream and/or in the transport stream packets, e.g. from the content server 112. For example, the AV stream and/or transport stream packets may include markers that indicate the start of one or more commercials and the end of one or more commercials.

The first processor, e.g. the AV stream processor 220, may replace transport stream packets associated with the first commercial, e.g. the transport stream packet associated with the start of the commercial, the transport stream packet associated with the end of the commercial, and the transport stream packets in-between, with transport stream packets associated with a second commercial and modify the corresponding stream parameters, such as PID, PCR, PTS, CC, etc. (408). For example, the AV stream processor 220 may retrieve a commercial from the storage device 244 and may replace the transport stream packets of the received commercial with the transport stream packets of the retrieved commercial and modify the corresponding AV stream parameters and/or attributes accordingly. In one or more implementations, the AV stream processor 220 may store a profile for each electronic device 102, 104, 106. The profile may be based on one or more characteristics of the user viewing each electronic device 102, 104, 106, and/or characteristics related to the AV programs previously transmitted to each electronic device 102, 104, 106. The AV stream processor 220 may retrieve a commercial from the storage device 244 based at least in part on a profile associated with the electronic device 102 to which the AV stream is being transmitted, and/or a profile associated with a user interacting with the electronic device 102.

The AV stream processor 220 may then transmit the transport stream packets to the electronic device 102 (410), e.g. via the switch device 210. For example, the AV stream processor 220 may encrypt the transport stream packets, e.g. using digital transmission content protection over internet protocol (DTCP-IP), and may packetize the transport stream packets, e.g. into IP packets, and may transmit the IP packets to the electronic device 102.

Figure 5:
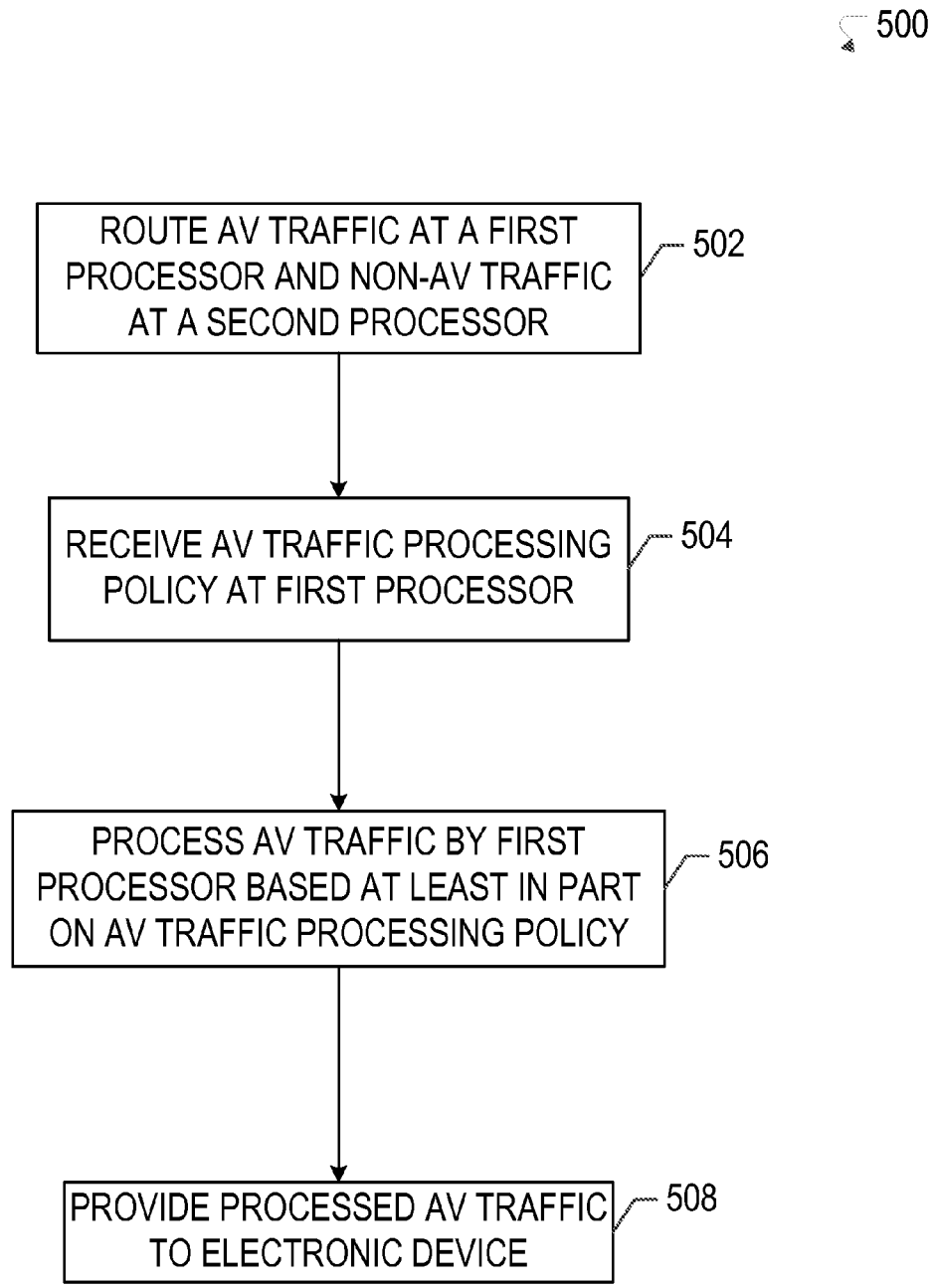
FIG. 5 illustrates a flow diagram of an example process of a system for application specific policy implementation and stream attribute modification in AV media in accordance with one or more implementations.

FIG. 5 illustrates a flow diagram of an example process 500 of a system for application specific policy implementation and stream attribute modification in AV media in accordance with one or more implementations. For explanatory purposes, the example process 500 is described herein with reference to the gateway device 120 of FIGS. 1 and 2; however, the example process 500 is not limited to the gateway device 120 of the example process 500 of FIGS. 1 and 2, and the example process 500 may be performed by one or more components of the gateway device 120. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The switch device 210 of the gateway device 120 receives AV traffic and non-AV traffic, e.g. from content server 112, and/or electronic devices 102, 104, 106. The switch device 210 routes the AV traffic to a first processor, e.g. the AV stream processor 220, and the non-AV traffic to a second processor, e.g. the host processor 230 (502). The first processor, e.g. the AV stream processor 220, may receive an AV traffic processing policy that may be based at least in part on an attribute that differentiates the AV traffic from the non-AV traffic (504). For example, the AV traffic may be associated with timing parameters, such as presentation time stamps, sequence numbers, and/or generally any characteristic of AV traffic, while the non-AV traffic may not. In one or more implementations, an AV traffic processing policy may be provided to the AV stream processor 220 via an application programming interface (API), or via a user interface provided by the AV stream processor, such as a graphical user interface. In one or more implementations, firmware of the AV stream processor 220 may be programmed with multiple different AV traffic processing policies and the AV traffic processing policies may be activated/deactivated via an API and/or a user interface. In one or more implementations, the AV traffic processing policies may relate to commercial insertion, trick modes, videoconferencing, adaptive bit rate (ABR) streaming, or generally any processing related to AV traffic.

The first processor, e.g. the AV stream processor 220, processes AV traffic based at least in part on the AV traffic processing policy (506). For example, if the AV traffic processing policy relates to performing server-based trick modes, the AV stream processor 220 may perform the process described above with respect to FIG. 3. Similarly, if the AV traffic processing policy relates to commercial insertion, the AV stream processor may implement the process described above with respect to FIG. 4. The first processor, e.g. the AV stream processor 220, then transmits the processed AV traffic to one or more of the electronic devices 102, 104, 106 (508).

Figure 6:
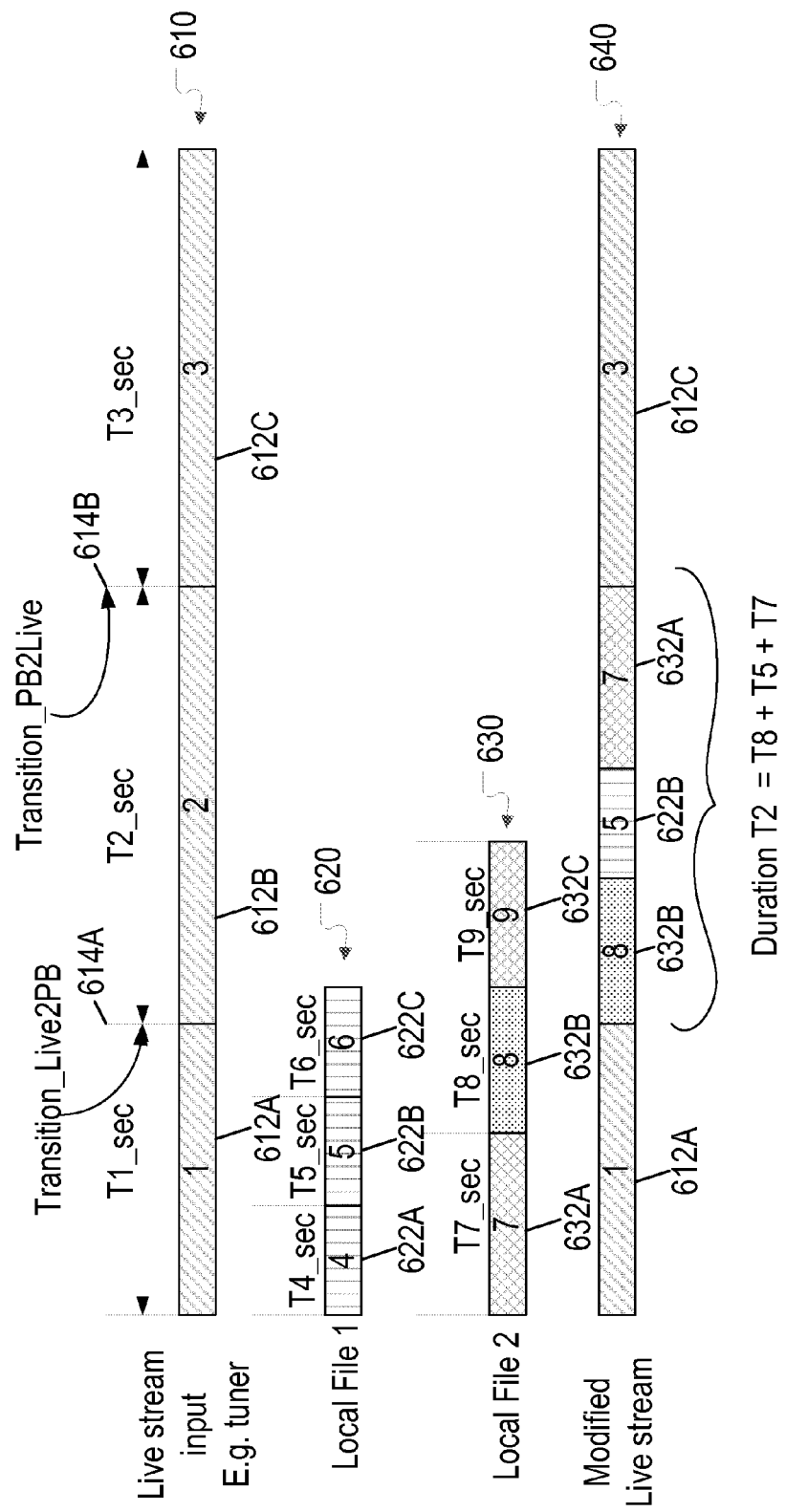
FIG. 6 illustrates an example stream modification for commercial insertion in accordance with one or more implementations.

FIG. 6 illustrates an example stream modification for commercial insertion in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In FIG. 6, a live stream 610 is received by the AV stream processor 220 from an input, e.g. a tuner, and the AV stream processor 220 may provide the live stream 610 to one or more of the electronic devices 102, 104, 106, such as the electronic device 102. The live stream 610 includes multiple segments 612A-C of durations T1_sec, T2_sec, and T3_sec, respectively, that are separated by program breaks 614A-B. The segment 612B may include one or more commercials. The AV stream processor 220 may be able to identify the beginning and end of the segment 612B based at least on the program breaks 614A-B.

The AV stream processor 220 may be configured to replace the commercials of the segment 612B with one or more commercials stored on the hard drive 121. For example, the local files 620, 630 may be stored on the hard drive 121. The local file 620 may include commercial segments 622A-C of durations T4_sec, T5_sec, and T6_sec, respectively. The local file 630 may include commercial segments 632A-C of durations T7_sec, T8_sec, and T9_sec, respectively.

The AV stream processor 220 may select one or more commercial segments 622A-C from the local file 620 and/or one or more commercial segments 632A-C from the local file 630 for which the total duration will be equivalent to the duration of the segment 612B, e.g. T2_sec. In one or more implementations, the AV stream processor 220 may select the one or more of the commercial segments 622A-C, 632A-C, e.g., based on a profile of a user associated with the electronic device 102 such that the selected commercial segments 622A-C, 632A-C are relevant to the user.

In the example illustrated in FIG. 6, the AV stream processor 220 selects the commercial segments 632B and 632A from the local file 630, and the commercial segment 622B from the local file 620, and determines that the total duration of the commercial segments 632B, 632A, 622B is equivalent to the duration of the segment 612B that is being replaced. Thus, the AV stream processor 220 generates the modified live stream 640 by replacing the segment 612B in the live stream 610 with the commercial segments 632B, 632A, 622B, and by modifying one or more parameters of the live stream 610, such as PCR, PID, PTS, CC, etc., to ensure MPEG compliance and to ensure that the modified live stream 640, with the inserted commercial segments 632B, 632A, 622B, will play seamlessly at the electronic device 102.

Figure 7:
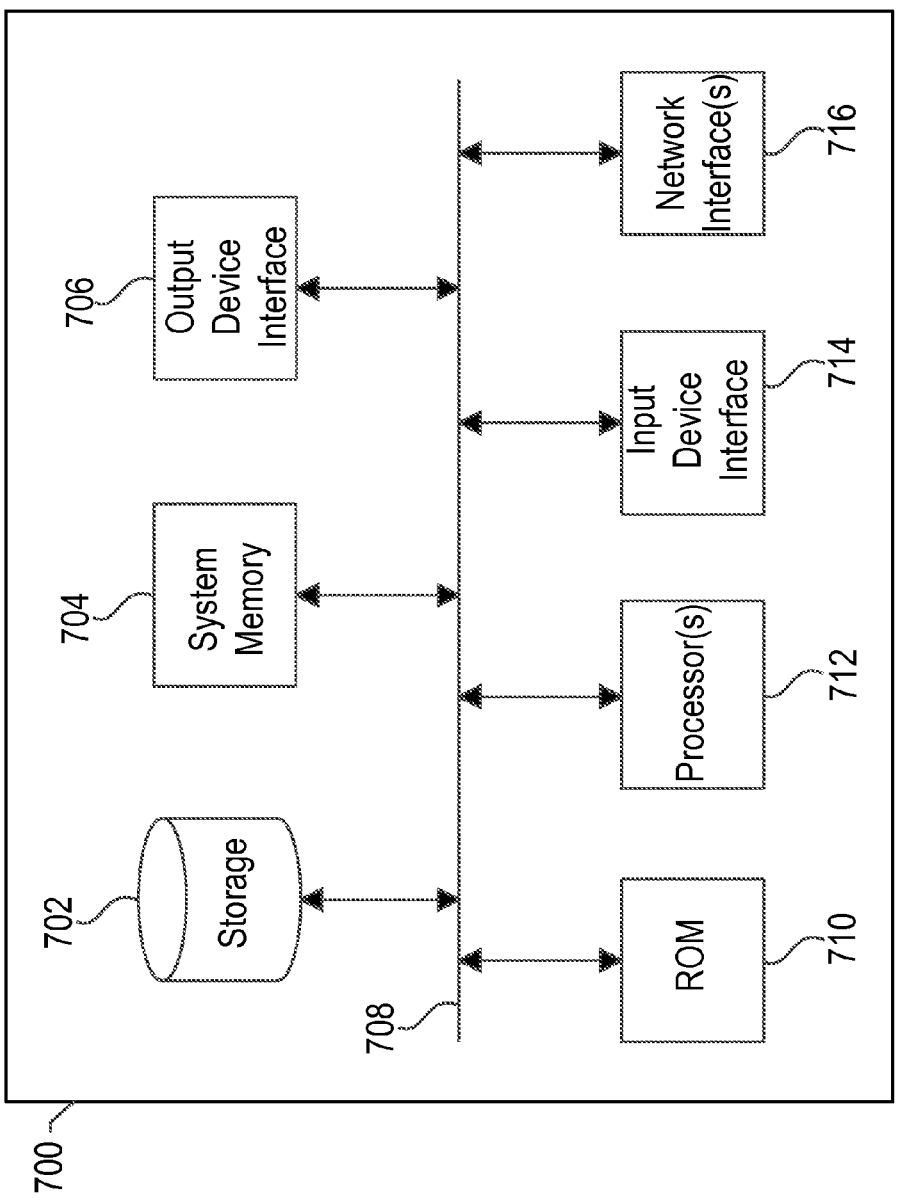
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 700 can be, and/or can be a part of, the gateway device 120, and/or one or more of the electronic devices 102, 104, 106. Such an electronic system includes various types of computer readable media and interfaces for various other types of computer readable media. The electronic system 700 includes a bus 708, one or more processor(s) 712, such as the AV stream processor 220 and/or the host processor 230, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown), one or more electronic devices 102, 104, 106, and/or content server 112, through one or more network interface(s) 716. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 700 can be a part of one or more networks of computers (such as a local area network ("LAN"), a wide area network ("WAN"), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, by a first processor of a device, transport stream packets comprising an AV stream, wherein AV traffic is routed to the first processor of the device for processing without being decoded and without passing through a second processor of the device while non-AV traffic is routed to the second processor of the device for processing without passing through the first processor of the device, the AV stream comprises at least one of an audio stream or a video stream, and the AV traffic comprises program clock reference values for the at least one of the audio stream or the video stream;
receiving a request to modify a presentation timing of the AV stream;
modifying, by the first processor of the device that receives the transport stream packets, presentation timing parameters of the transport stream packets based at least in part on the received request; and
transmitting the transport stream packets to an electronic device.

2. The method of claim 1, wherein receiving, by the first processor, the transport stream packets comprising the AV stream further comprises receiving, by the first processor, the transport stream packets comprising the AV stream from at least one of a local storage device or a local AV source.

3. The method of claim 1, wherein the transport stream packets comprise a portion of the AV traffic that is routed to the first processor.

4. The method of claim 1, wherein the received transport stream packets are encrypted, and the method further comprising:
decrypting the encrypted transport stream packets to access the transport stream packets.

5. The method of claim 1, further comprising:
dropping some of the transport stream packets based at least in part on the received request.

6. The method of claim 5, wherein modifying the presentation timing parameters of the transport stream packets based at least in part on the received request further comprises:
modifying the presentation timing parameters of the transport stream packets to account for the dropped transport stream packets; and
inserting at least one transport stream packet comprising at least one of a dummy video frame or a mute audio frame.

7. The method of claim 1, further comprising:
encrypting the transport stream packets prior to transmitting the transport stream packets to the electronic device.

8. The method of claim 1, wherein the request to modify the presentation timing of the AV stream comprises at least one of a request to fast forward the AV stream, a request to rewind the AV stream, a request to jump forward in the AV stream, or a request to jump backward in the AV stream.

9. The method of claim 1, wherein the timing parameters comprise at least one of a presentation time stamp (PTS) value, a program reference clock (PCR) value, a packet identifier (PID), or a continuity counter (CC) value.

10. The method of claim 1, wherein the AV traffic is routed to the first processor by a switch device of the device and transmitting the transport stream packets to the electronic device further comprises transmitting the transport stream packets to the electronic device via the switch device.

11. A non-transitory computer-readable medium storing a computer program product comprising instructions, the instructions comprising:
instructions to receive, by a first processor of a device, transport stream packets comprising an audio video (AV) stream, wherein AV traffic is routed to the first processor of the device for processing and depacketizing while non-AV traffic is routed to a second processor of the device for processing without passing through the first processor, the AV stream comprises at least one of an audio stream or a video stream, and the non-AV traffic being exclusive of program clock reference values corresponding to the at least one of the audio stream or the video stream;
instructions to determine, by the first processor of the device and based at least in part on timing parameters of the transport stream packets, a starting transport stream packet associated with a start of the first commercial and an ending transport stream packet associated with an end of the first commercial;
instructions to replace the starting transport stream packet, the ending transport stream packet, and the transport stream packets in between with transport stream packets comprising a second commercial that is different than the first commercial; and
instructions to transmit the transport stream packets to an electronic device.

12. The non-transitory computer-readable medium of claim 11, wherein the transport stream packets comprise a portion of the AV traffic that is routed to the first processor.

13. The non-transitory computer-readable medium of claim 11, wherein the instructions to receive, by the first processor, the transport stream packets comprising the AV stream comprises instructions to receive, by the first processor, the transport stream packets comprising the AV stream from at least one of a local storage device or a local AV source.

14. The non-transitory computer-readable medium of claim 11, wherein the transport stream packets are encrypted and the instructions further comprise:
instructions to decrypt the encrypted transport stream packets to access the transport stream packets.

15. The non-transitory computer-readable medium of claim 11, wherein the instructions further comprise:
instructions to receive a starting timing parameter associated with the start of the first commercial and an ending timing parameter associated with the end of the first commercial, wherein the starting transport stream packet is determined based at least in part on the starting timing parameter and the ending transport stream packet is determined based at least in part on the ending timing parameter.

16. A system comprising:
a switch device that is configured to route received audio video (AV) traffic to a first processor and received non-AV traffic to a second processor without passing the non-AV traffic through the first processor, wherein the AV traffic comprises at least one attribute that differentiates the AV traffic from the non-AV traffic, the AV traffic comprising audio data, video data, or information associated therewith, the received AV traffic being exclusive of the received non-AV traffic, and the switch device being distinct from the first and second processors;
the first processor that is configured to receive an AV traffic processing policy, process the AV traffic based at least in part on the AV traffic processing policy, and transmit the processed AV traffic to an electronic device via the switch device, wherein the AV traffic processing policy is based at least in part on the at least one attribute that differentiates the AV traffic from the non-AV traffic; and
the second processor that is configured to process the non-AV traffic.

17. The system of claim 16, wherein the at least one attribute comprises presentation timing parameters associated with the AV traffic.

18. The system of claim 16, wherein the first processor is configured to receive the AV traffic processing policy via a user interface.

19. The system of claim 16, wherein the AV traffic comprises at least one of a first AV stream transmitted to the switch device by an AV server, a second AV stream received by the first processor from a local storage device, or a third AV stream received by the first processor from a local AV source.

20. The system of claim 16, wherein the AV traffic is encrypted and the first processor is configured to decrypt the encrypted AV traffic to access the AV traffic, process the AV traffic based at least in part on the AV traffic processing policy, encrypt the AV traffic, and transmit the encrypted AV traffic to the electronic device via the switch device.

* * * * *